United States Patent Office 3,488,702
Patented Jan. 6, 1970

---

3,488,702
PRODUCTION OF INORGANIC FLUORO-CHEMICALS AND SILICON DIOXIDE
Albert P. Giraitis and Paul Kobetz, Baton Rouge, Roy J. Laran, Greenwell Springs, and Hymin Shapiro, Baton Rouge, La., assignors to Ethyl Corporation, New York, N.Y., a corporation of Virginia
No Drawing. Filed May 31, 1966, Ser. No. 553,672
Int. Cl. C01d *3/02, 33/12, 33/32*
U.S. Cl. 23—88
4 Claims

ABSTRACT OF THE DISCLOSURE

A process for the coproduction of sodium fluoride and silicon dioxide by reacting sodium hydroxide and either fluosilicic acid or sodium silicofluoride in such proportions that all of the sodium fluoride coproduced remains dissolved in aqueous solution, the sole precipitated product being gelatinous silicon dioxide; separating the precipitated silicon dioxide and said solution; and reacting the sodium fluoride in said solution with a reactant selected from either aluminum sulfate or aluminum fluoride to produce cryolite.

---

The present invention relates to the production of sodium fluoride, silicon dioxide and cryolite. More specifically, it relates to the production of aqueous solutions of sodium fluoride by two routes, which sodium fluoride is especially adapted to the production of cryolite by reaction of the aqueous solutions of sodium fluoride with either alum or alumnium fluoride.

The chemical reactions involved in the present invention are as follows:

(1)  $H_2SiF_6 + 3NaCl \rightarrow Na_2SiF_6 + 2HCl + NaCl$ (2)  $Na_2SiF_6 + 4NaOH \rightarrow 6NaF + SiO_2 + 2H_2O$ Thus sodium fluoride may be produced through reactions (1) and (2), supra, or by:

(3)  $H_2SiF_6 + 6NaOH \rightarrow 6NaF + SiO_2 + 4H_2O$

Sodium metasilicate may be produced by reacting the precipitated silicon dioxide of either of reactions (2) or (3) with additional sodium hydroxide:

(4)  $SiO_2 + 2NaOH \rightarrow Na_2SiO_3 + H_2O$

Aluminum fluoride may be produced by the following reaction:

(5)  $H_2SiF_6 + Al_2O_3 \cdot 3H_2O \rightarrow 2AlF_3 + SiO_2 + 4H_2O$

Cryolite may then be formed by two routes, both using the sodium fluoride formed in either of reactions (2) or (3), thusly:

(6)  $6NaF + \frac{1}{2}Al_2(SO_4)_3 \rightarrow Na_3AlF_6 + \frac{3}{2}Na_2SO_4$ (7)  $3NaF + AlF_3 \rightarrow Na_3AlF_6$ Reaction (6) employs alum while reaction (7) advantageously, though not necessarily, employs the aluminum fluoride formed in reaction (5).

Each of the chemical reactions above set forth is known in the art. However, so far as can be ascertained, the particular combinations of reactions and the concentrations of certain of the reactants in the reactions were not known heretofore.

In the prior art in the practive of reactions (2) and (3) it is known to use the reactants in a concentrated mixture in order to precipitate sodium fluoride which has limited solubility in water—on the order of 3 to 5 weight percent. Unfortunately, the sodium fluoride precipitates from solution along with silicon dioxide and must be leached out of the silicon dioxide. However, repeated washing of the precipitate fails to completely remove the sodium fluoride from the silicon dioxide, and thus some sodium fluoride is here wasted. Additionally, the 3 to 5 weight percent of sodium fluoride which remains in solution and fails to precipitate is likewise wasted. Further, the leached silicon dioxide remains contaminated with sodium fluoride and is hereby rendered unfit for many commercial uses.

The prior art likewise reacts sodium hydroxide and fluosilicic acid in a molar ratio of 8.1 or greater, respectively, to produce sodium fluoride and sodium metasilicate. The sodium metasilicate thus formed is soluble in water; hence, the sodium fluoride may be removed from this solution without the presence of an additional precipitated solid. Even so, it is found that a large quantity of sodium metasilicate is entrained in the sodium fluoride which cannot be economically removed by washing. This impurity renders the thus produced sodium fluoride substantially unfit for the commercial production of cryolite. In addition, the by-product sodium metasilicate solution is contaminated with sodium fluoride and unfit for many commercial uses.

Reaction (5) is utilized in the prior art to produce hydrated aluminum fluoride. The prior art teaches that it requires 3 to 4 hours to precipitate and remove aluminum fluoride from solution in 80 to 85 percent yields. Aluminum fluoride thus produced can be reacted with sodium fluoride as in reaction (7) to yield cryolite. One disadvantage of this combination reaction process lies in the low yields of aluminum fluoride which reduce production of cryolite.

It is an object of the present invention to overcome each of the above noted disadvantages of the prior art. It is further an object of the present invention to achieve an efficient and economical process through attainment of high conversions of the reactants and high yields of the desired products. Other objects of the invention will in part be inherent in the following description.

The present invention relates in part to a process for the co-production of sodium fluoride and silicon dioxide by reacting sodium hydroxide with either fluosilicic acid or sodium silicofluoride. It is critical in order to achieve all of the advantages of the present invention in the practice of these two reactions that the relative and absolute quantities of reactants be controlled. That is, too much sodium hydroxide relative to either fluosilicic acid or sodium silicofluoride results in conversion of the product silicon dioxide to sodium metasilicate which is soluble and contaminates the sodium fluoride solution. The absolute quantities of reactants per unit volume should likewise be controlled since, according to a further feature of the invention, all of the sodium fluoride coproduced remains dissolved in aqueous solution, the sole precipitated produce being the silicon dioxide. As only 3 to 5 weight percent of sodium fluoride is soluble in water, it is evident that the reactants should be quite dilute.

According to a further feature of the present invention, the temperature of the reaction system is within the range of about 90° C. to about 100° C. for a period of time sufficiently long as to cause the precipitated gelatinous silicon dioxide product to become particulate. Heat may be supplied to the reaction system by preheating the reactants and/or heating the product solution.

Once the silicon dioxide has been rendered particulate it may be easily separated from the product solution by such means as filtration. Such silicon dioxide, after preferably being washed and dried, may then be further reacted with sodium hydroxide to produce relatively pure sodium metasilicate.

In accordance with a further embodiment of the present invention, the co-produced solution of sodium fluoride, after the silicon dioxide has been removed, is reacted with an aqueous solution of either aluminum sulfate or aluminum fluoride to produce cryolite. The aqueous solution of aluminum fluoride may be produced, according to a preferred practice, by reacting aqueous fluosilicic acid with aluminum oxide trihydrate.

Having thus briefly set forth the present invention, the following is a more detailed disclosure thereof.

In reaction (1) in the preparation of sodium silicofluoride it is desirable to employ any concentration of fluosilicic acid solution which is relatively free of impurities and may be economically used to produce sodium silicofluoride. The sodium chloride is preferably dissolved in water and is desirably in about 50 percent excess of the amount theoretically necessary to produce 100 percent conversion of the acid. The excess salt serves to suppress the solubility of the sodium silicofluoride, thereby increasing the precipitated yield thereof. The order of addition of reactants is generally not important in this reaction. A suitable reaction time and temperature are about one-half hour at about room temperature; both of these are subject to reasonably wide variation without significant adverse effects upon the reaction. Precipitate of sodium silicofluoride forms immediately in the reaction; it may be isolated by a number of means well known in the art, e.g. filtration or centrifugation followed by decantation. Preferably, the sodium silicofluoride thus isolated is then dried. Drying may likewise be accomplished by methods and means well known in the art.

To carry out reaction (2) it is preferable to add aqueous sodium hydroxide to the sodium silicofluoride. It is critical in order to achieve all of the advantages of the present invention in the practice of this reaction that the relative and absolute quantities of sodium hydroxide and sodium silicofluoride be controlled. The molar ratio of sodium hydroxide to sodium silicofluoride should not exceed 4:1. Otherwise, the excess sodium hydroxide reacts with the precipitated silicon dioxide to form sodium metasilicate which is soluble and contaminates the sodium fluoride solution. It is also necessary to control the absolute quantities per unit volume of reactant solution of sodium hydroxide and sodium silicofluoride since, according to the present invention, no more sodium fluoride must be produced than can remain dissolved in aqueous solution—on the order of 3 to 5 weight percent. This means that, generally, both reactants must be in dilute aqueous solutions or, at least, the sodium hydroxide solution must be very dilute in the event the sodium silicofluoride is added as a solid or a slurry. The silicon dioxide formed in the reaction may be easily filtered, or otherwise removed from the product solution, by preheating the reactants and/or heating the product solution at from about 90° C. to about 100° C. for about one-half hour. However, wide temperature and time ranges are suitable. Heating makes the gelatinous silicon dioxide become particulate.

It is critical in order to achieve all the advantages of the present invention in the practice of reaction (3), as it was critical in reaction (2), that the relative and absolute quantities of reactants be controlled. The molar ratio of sodium hydroxide to fluosilicic acid should not exceed 6:1. Otherwise, as just explained, the silicon dioxide product will be converted to sodium metasilicate. Since no more sodium fluoride should be produced than can remain in solution, the quantities of reactants per unit volume of aqueous solution should also be controlled. Dilute solutions of both reactants may be employed, but, at the very least, a very dilute solution of sodium hydroxide must be employed if a more concentrated solution of acid is used. In order to render the precipitated gelatinous silicon dioxide particulate, the product solution should be preferably maintained for about one-half hour at a temperature of about 90° C. to about 100° C. This may be accomplished by preheating the reactants and/or heating the product solution. Wider temperatures and time ranges are suitable but less preferred. A preferred order of addition of reactants is sodium hydroxide to fluosilicic acid.

The silicon dioxide from reactions (2) and (3) is a valuable by-product. It is fine, highly reactive, and may be used as a catalyst. Reaction with additional sodium hydroxide produces sodium metasilicate as shown in reaction (4). This process produces a relatively pure sodium metasilicate unlike the prior art process discussed above. It is preferred to use a 50 weight percent caustic solution although a wide range of concentration is suitable. The order of addition of reactants is not generally important. The reactant solution is preferably heated to boiling for a period of about 5 minutes. The heating period is, however, subject to wide variation without noticeable detrimental effects.

Reaction (5) is directed to the formation of aluminum fluoride by the reaction of 5 to 50 percent by weight of fluosilicic acid with aluminum oxide trihydrate. A more preferred range of acid concentration is 15 to 20 percent in reaction solution. The acid is desirably preheated to about 70° C. The preferred mode of addition of reactants is aluminum oxide trihydrate to fluosilicic acid. The solution of acid and aluminum oxide trihydrate is raised to a temperature of between about 70° C. to about 100° C. for a total reaction time not exceeding one hour and preferably less than one-half hour. The silicon dioxide precipitate may be easily removed by filtration or other similar means. The clear filtrate solution of aluminum fluoride is then available for further reaction to form cryolite. It is important that the time of heating the reaction mixture be carefully controlled to get maximum conversion to the soluble alpha form of aluminum fluoride. If heating is continued, the insoluble beta form of aluminum fluoride precipitates, thus reducing yields.

Reactions (6) and (7) relate to the formation of cryolite. The dilute concentration of sodium fluoride (3 to 5 percent) from reactions (2) and (3) is ideal for reactions (6) and (7). Reaction (6) usually results in a 98 to 100 percent conversion of sodium fluoride and a 96 to 100 percent yield of cryolite. The order of addition of reactants is generally not important. Preferably a 20 to 28 weight percent solution of alum is mixed with the 3 to 5 weight percent solution of sodium fluoride. However, a wide range of concentration of alum is suitable. A preferred temperature range and reaction time are about 90° C. to about 100° C. for about one-half hour, but these are subject to reasonably wide variation. The cryolite and sodium sulfate formed by this reaction may be separated easily by filtration as the cryolite is quite insoluble.

In reaction (7) the aluminum fluoride is preferably added as a 10 to 15 weight percent solution, but a much wider range of concentration is suitable. The order of addition of reactants is generally not important. The reaction is preferably conducted at about room temperature for from about 15 to about 30 minutes; but again, these conditions are subject to wide variation without significant effects on the reaction. The reaction is usually quantitative.

Having thus set forth the present invention, the following examples are presented only as illustrative thereof, and not as limiting:

EXAMPLE I 74.2 grams of 30 weight percent fluosilicic acid were combined with 28 grams of sodium chloride dissolved in 78 ml. water. This represented a 50 percent excess of sodium chloride. The precipitate of sodium silicofluoride formed immediately. It was then separated from the resultant hydrogen chloride solution by filtration. The precipitate was next dried. The yield of sodium silicofluoride was 98.6 percent. 14.9 grams of sodium silicofluoride were then combined with 25.4 grams of a 50 weight percent caustic solution and 500 milliliters of water in order to form a saturated solution of sodium fluoride. The silicon dioxide produced was filtered after heating the solution to boiling. A quantitative yield of sodium fluoride in solution was obtained.

EXAMPLE II

Sodium fluoride was synthesized from one mol of fluosilicic acid and 6 mols of caustic. 37.9 grams of 30.25 weight percent fluosilicic acid were added to 38.9 grams of a 49.6 percent caustic solution and 150 milliliters of water. After about 1 minute, the silicon dioxide gel formed. More water was then added, about 350 milliliters, and the mixture was brought to boiling for about 25 minutes during which the gel became particulate. The silicon dioxide was then separated by filtration, leaving the clear sodium fluoride solution.

EXAMPLE III 58.6 grams of 31.50 weight percent fluosilicic acid were diluted with 50 milliliters of water and preheated to 70° C. Then 20.00 grams aluminum oxide trihydrate were added, and the temperature raised to 75° C.–90° C. for 15 minutes and to 90° C.–100° C. for an additional 10 minutes. The reaction mixture was filtered hot and washed three times with 50 milliliter portions of water. This solution was then added to 32.3 grams sodium fluoride dissolved in 700–800 milliliters water, and the mixture was stirred for a few minutes and then filtered. The filtrate was next dried. 50.10 grams cryolite were obtained for a 93.1 percent yield, meaning that the yield of aluminum fluoride in solution was 93.1 percent since the reaction of sodium fluoride with aluminum fluoride is known to be quantitative.

EXAMPLE IV 48.4 grams of aluminum sulfate solution in 28 weight percent concentration were combined with 20 grams of sodium fluoride dissolved in 400–500 milliliters of water. The cryolite formed immediately, forming an opaque solution. This mixture was heated to boiling for 25 minutes after which the solution was filtered hot, thereby separating the cryolite from the sodium sulfate by-product dissolved in water. The cryolite was then washed and dried at 125° C. The dried cryolite sample weighed 16.65 grams, which was virtually a 100 percent yield. This sample was shown by X-ray analysis to be primarily cryolite in high purity. Chemical analysis showed the cryolite sample to be a minimum of 98 percent pure. The silicon analysis of this sample of cryolite showed only 0.025 percent silicon.

EXAMPLE V 4.9 grams of dried silicon dioxide from Example II were reacted with 12.8 grams of 49.6 weight percent sodium hydroxide. The mixture was heated to boiling for five minutes to give a clear solution which by analysis contained 8.96 grams sodium metasilicate, a 92.6 percent yield.

It will be understood that while there have been given herein certain specific examples of the practice of this invention, it is not intended thereby to have this invention limited to or circumscribed by the specific details of materials, proportions, or conditions herein specified, other than where explicitly stated, in view of the fact that this invention may be modified according to individual preference or conditions without necessarily departing from the spirit of the disclosure and the scope of the appended claims.

What is claimed is:
1. A process for the co-production of sodium fluoride and silicon dioxide comprising:
   (A) reacting sodium hydroxide with a member selected from the group consisting of
      (1) fluosilicic acid in an amount such that the molar ratio of said sodium hydroxide to said fluosilicic acid is not greater than about 6:1 thereby avoiding the formation of sodium metasilicate, and
      (2) sodium silicofluoride in an amount such that the molar ratio of said sodium hydroxide to said sodium silicofluoride is not greater than about 4:1 thereby avoiding the formation of sodium meta-silicate.
   (B) conducting the reaction in the presence of sufficient water that all of the sodium fluoride co-produced with silicon dioxide remains dissolved, the sole precipitated product being gelatinous silicon dioxide;
   (C) heating the reactant solution for a sufficient time to cause said gelatinous silicon dioxide to become particulate, and separating the particulate silicon dioxide from the solution.
2. The process of claim 1 further characterized by heating the reactant solution for about one-half hour at a temperature of about 90° C. to about 100° C. to cause said gelatinous silicon dioxide to become particulate.
3. The process of claim 1 further characterized by reacting the particulate silicon dioxide with sodium hydroxide to produce sodium metasilicate.
4. The process of claim 1 further characterized by separating the particulate silicon dioxide and reacting the sodium fluoride in the solution with a reactant selected from the group consisting of aluminum sulfate and aluminum fluoride to produce cryolite.

References Cited

UNITED STATES PATENTS

| | | | |
|---|---|---|---|
| 447,063 | 2/1891 | Richters | 23—88 |
| 1,324,030 | 12/1919 | Bowman | 23—88 |
| 1,382,165 | 6/1921 | Bishop | 23—88 |
| 2,031,554 | 2/1936 | Torchet | 23—88 |
| 2,305,921 | 12/1942 | Eringer | 23—88 |
| 2,692,186 | 10/1954 | Kamlet | 23—88 |
| 2,783,128 | 2/1957 | Wendt | 23—88 |
| 2,842,426 | 7/1958 | Glocker | 23—88 |
| 2,916,352 | 12/1959 | Fitch et al. | 23—88 |

EDWARD STERN, Primary Examiner

U.S. Cl. X.R.

23—110, 182